United States Patent [19]

Raschbichler et al.

[11] 4,246,694
[45] Jan. 27, 1981

[54] METHOD OF MAKING LINEAR MOTOR STATOR

[75] Inventors: Hans-Georg Raschbichler, Ottobrunn; Otto Breitenbach, Nuremberg; Jürgen Böll, Nuremberg; Josef Uttenreuther, Nuremberg, all of Fed. Rep. of Germany

[73] Assignees: Kabel-und Metallwerke Gutehoffnungshutte Aktiengesellschaft, Hanover; Thyssen Industrie Aktiengesellschaft, Essen, both of Fed. Rep. of Germany

[21] Appl. No.: 909,794

[22] Filed: May 26, 1978

[30] Foreign Application Priority Data

May 14, 1977 [DE] Fed. Rep. of Germany ....... 2721905

[51] Int. Cl.³ .......................................... H02K 15/04
[52] U.S. Cl. ....................................... 29/596; 29/736
[58] Field of Search ................. 29/596, 598, 736, 732; 310/12, 13, 260, 42

[56] References Cited

U.S. PATENT DOCUMENTS

| 2,506,173 | 5/1950 | Polard | 29/736 |
| 3,495,109 | 2/1970 | Ames | 310/260 X |
| 3,648,084 | 3/1972 | Laithwaite et al. | 310/13 |
| 3,675,757 | 7/1972 | Yabuta | 310/12 X |

Primary Examiner—Carl E. Hall
Attorney, Agent, or Firm—Smyth, Pavitt, Siegemund, Jones & Martella

[57] ABSTRACT

The stator of a linear motor is assembled by separately assembling the windings as a uniform configuration, using a dummy to place cables into requisite positions and tieing the resulting coil ends together by end elements. The dummy is of an endless belt variety and is used to assemble the stator winding configuration in endless type fashion. The resulting assembly is placed into the stator core or cores which have been placed along the contemplated track part along which the motor is to move a vehicle or the like, carrying the armature of the motor.

4 Claims, 3 Drawing Figures

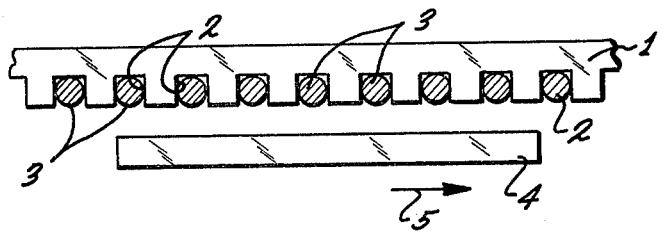
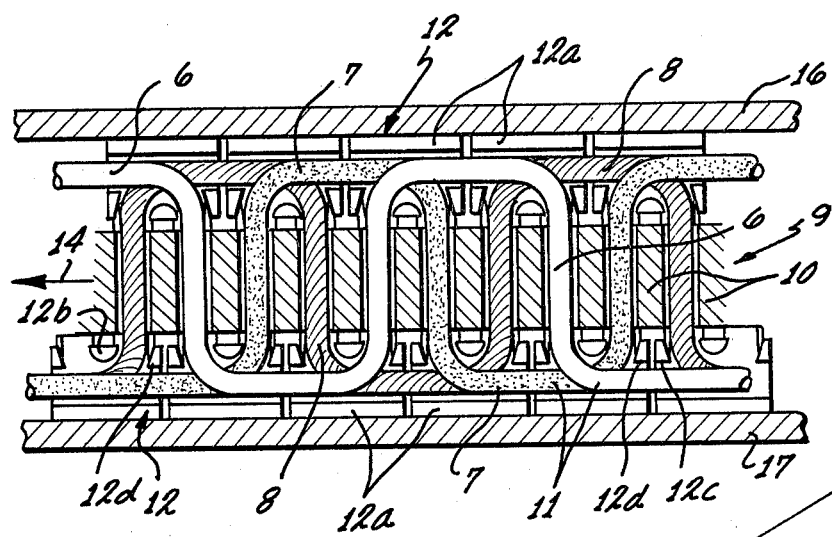
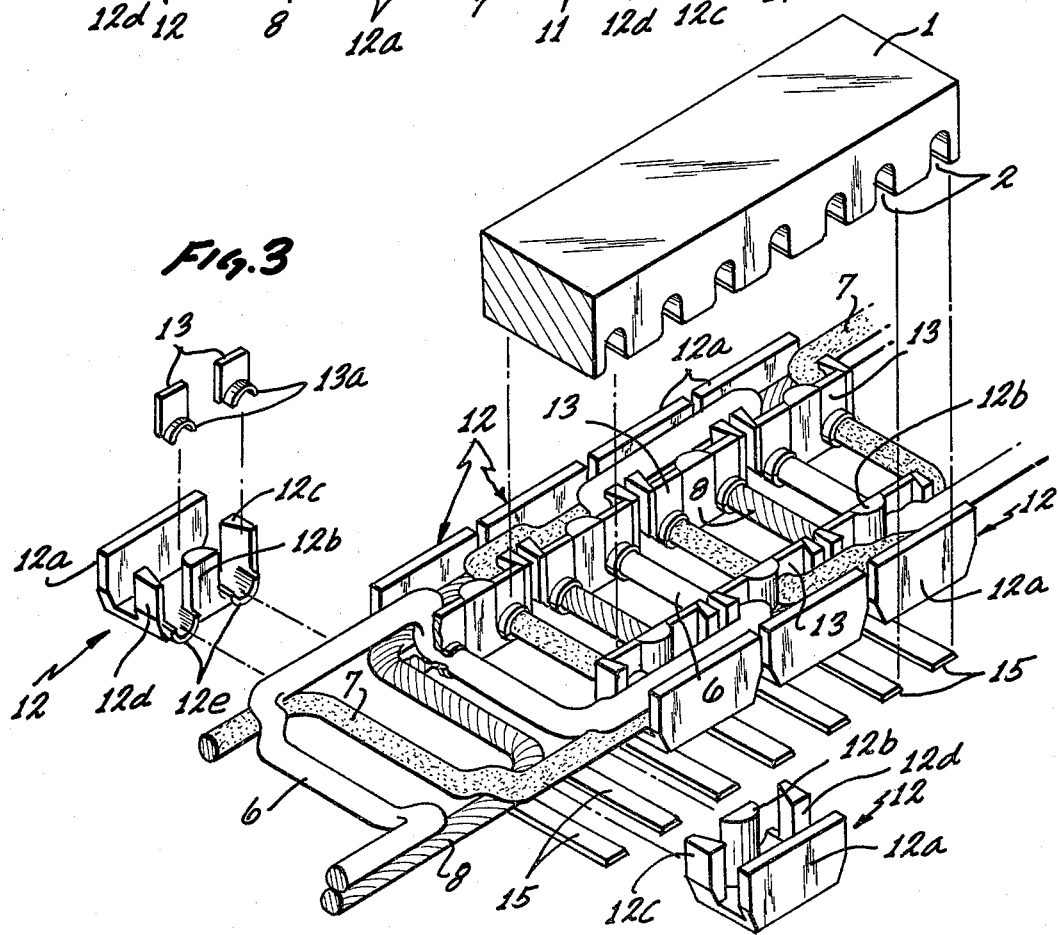

METHOD OF MAKING LINEAR MOTOR STATOR

BACKGROUND OF THE INVENTION

The present invention relates to linear motors, and more particularly, the invention relates to linear motors provided for polyphase, e.g. three-phase a.c. energization Linear motors are well known in the art, and they have been used for a variety of purposes. A linear motor is usually constructed to have a stationary element or stator and a movable element or armature. Construction and designs details differ depending, for example, on the mode of operation. Such a motor may be constructed to be operated by d.c., or it may be constructed as an a.c.-asynchronous motor or as an a.c.-synchronous motor. Unlike the rotor in a regular motor, the armature of a linear motor moves along a straight path which means that electrical energy is directly converted into energy of a translatory (rather than a rotational) motion. Of course, the linear path may also be a curved one depending on the purpose of the armature movement, but the armature does not have an axis of rotation as far as the linear motion is concerned.

As far as structure is concerned, the core of the stator is provided with grooves which receive the several energizing coils. An a.c. motor may have its coils connected to a three-phase power supply system. The armature may be comprised of a rail-like element made of electrically conductive material such as copper or aluminum in an asynchronous motor. A permanent magnetic element is usually used in a synchronous motor.

As far as employment and use is concerned, linear motors have been used in transportation facilities, in conveyors generally, and for baggage handling in particular; they have also been used in mining, in dragging equipment, and in cranes; linear motors are still further used in machine tools, in plotters, as drives in slides, etc. The length of such a motor depends largely on its use, and it will be appreciated that some of the uses may require very long stators. A typical example here is a transport or conveyor system using a vehicle on which is mounted an armature cooperating with the stator disposed along the track or path of the vehicle.

DESCRIPTION OF THE INVENTION

It is an object of the present invention to provide a new and improved linear motor which can be made in a simple manner, independent from its length and by unskilled personnel.

It is accordingly an object of the present invention to provide a new and improved construction for linear motors, and it is a companion object of the present invention, to provide a new and improved method of making such motors.

In accordance with the preferred embodiment of the invention, it is suggested to assemble a coil configuration separately and independently from any positioning of the coils and windings into the stator core. One will use here an accessory which could also be termed a stator core dummy in that it provides for spacers and gaps resembling the stator core grooves. The coil structure is assembled in the dummy by means of placing regular cables into the gaps of the dummy and looping the cable around the spacers separating the gaps in a meandering pattern and in such a manner that the coil end loops of adjacent coils always overlap. These overlapping loops are tied together by individual end pieces.

The dummy is preferably constructed as an endless belt having a length which is much shorter than the stator coils to be assembled. The coil configuration is assembled on the belt-dummy and in steps by the particular placement of portions of individual cables into the available gaps; the end loops are fastened together as stated, and the assembly is withdrawn as the belt moves. The resulting coil configuration can be separately handled as an entity; it can be coiled on a drum or the like, and moved to the installation site where it is placed into the stator core grooves. The entire procedure requires little skill, and one can assemble stator coils on an endless basis or at least in lengths equivalent to the maximum storage capacity of a drum.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic view of a linear motor showing its basic components;

FIG. 2 is a top view of an accessory resembling a stator core for assembling the coils of a linear motor constructed in accordance with the preferred embodiment of the invention; and FIG. 3 is an exploded, perspective view of the stator, showing particularly the pre-assembled coil configuration.

Proceeding now to the detailed description of the drawings, FIG. 1 shows a linear motor being constructed to have a stator 1 and an armature 4. The core of stator 1 is provided with transversely extending grooves 2 containing a coil assembly 3 for the generation of a traveling wave-like stator field. The stator and armature are separated from each other by an air gap.

The armature 4 is made of copper, aluminum or a permanent magnetic material, and is mounted to a device which is to be linearly moved in the direction of arrow 5. That device may be a vehicle, a conveyor, etc. Rather long stator configurations are presently envisioned, and the inventive concept is practiced with particular advantage in and for very long stators to be placed along a path in which such a device is to be moved.

The stator winding 3, is made of three components 6, 7, 8, which are regular, low or medium voltage type cables. Each cable includes a conductor or conductors made of stranded fibers, and being suitably jacketed including insulation made of heat resisting plastic. Conceivably, a conductive layer may be provided above the insulation. The cables have been marked differently in FIGS. 2 and 3 to facilitate recognition and individual tracing. In reality, it is conceivable that the different cables do have distinctive markings such as color coding on the insulation or the like to facilitate identification in the case of repairs.

These three stator winding elements are placed into the grooves of the stator core for purposes of obtaining a three-phase winding. For this, the three cables are suitably shaped and packaged and one obtains a coherent, structural unit for placement into the grooves. The assembly of such structural unit constitutes a significant aspect of the present invention.

In order to assemble the winding of the motor, one uses a dummy 9 which resembles the stator core. The dummy 9 includes particularly spaced blocks 10 or spacer elements, separated by gaps or grooves. These gaps have length, width and depth corresponding to the grooves of the stator core. The blocks 10 are constructed accordingly to simulate the stator poles. The individual cable 6, 7, 8, are placed into the gaps between blocks 10 and as shown in FIG. 2.

The dummy is furthermore constructed as an endless chain or belt, carrying the blocks 10. The chain or belt runs between (stationary) retaining walls 16 and 17 and loops around two pulleys or sprocket wheels (not shown). The chain or belt portion extending from one pulley to the other is much shorter than the length of the stator coil assembly to be made. The cables are laid individually into the gaps between the spacer blocks, one at a time, and in a meandering pattern of alternatingly inverted U's. The bottom of each U is located outside of the gaps and extends in each instance along three spacer blocks. These portions of the cable can also be termed coil ends, identified by numeral 11. The coil ends 11 are tied and fastened together in a manner described more fully below.

After a portion of the cable has been assembled on the upper stringer of the belt or chain, the chain is moved and the portion of the assembly thus made is taken off the chain or belt while the cables are being laid into spacer block gaps freshly appearing in the assembly plane and constituting the upper stringer at that instant, until the chain is advanced again, etc. Actually, one can make this assembly on a more or less continuous basis.

Specifically in FIG. 2, the cable 8 was the first one which has been laid into gaps spaced in sequence by two gaps. Next, cable 7 was placed into one of each pair of remaining gaps, and finally, cable 6 was placed into the remaining gaps. As a consequence, respective two coil ends overlap adjacent to the particular spacer block separating the two gaps into which the respective two cables have been laid. Each two overlapping coil ends are separately tied together adjacent to the particular spacer block just referred to.

Generally speaking, the coil ends 11 in each instance should be as tight as possible, as there should be little or no slack in the cables, and these ends should not project far from the stator body. Due to some inherent resiliency of the cables used, the individual cable will not retain the desired meandering shape. Therefore, additional structure components are used to provide for positive retention of the positions of the ends 11.

As shown in FIG. 2, end pieces 12 are provided to hold the cable portions as they loop into and out of the gaps. These end pieces are made of rather strong material, and they are also used individually to tie the overlapping coil ends together in pairs. They are placed into the space between the blocks 10 and the side walls 16, 17. Portions of the end pieces 12 are provided with curved contours to match the expected curving of the cables 7, 8, 9.

Each end piece 12 has a center post 12b around which loop two coil ends from two different cables. A front shield 12a of that end piece and side parts 12c and 12d thereof act together with the center post 12b to positively position the respective two coil ends and protect them physically. It can thus be seen that the placement of these end pieces 12, alongside the blocks, precedes the placement of the cables and is followed by placing small locking pieces 13 on top of the respective two cable between the center post 12b and the side elements 12c, d of pieces 12, to provide an end element in each instance for tieing two coil end loops together. The exploded view of FIG. 3 shows two lock pieces 13 prior to their connection to an end piece 12. The connection when made may involve bonding of any kind such as by means of an adhesive or by means of welding, soldering or the like. The lock pieces as well as the end pieces 12 have half shells which match the contour of the cables and position the cables in the gaps in a common plane.

The placed cables with end pieces 12 attached form a coherent or unitary structure which can be taken off the dummy in that the "bottom" of the chain drops off and the blocks 10 are withdrawn from between the cables as the belt or chain 9 loops around a pulley, while new end pieces 12 are placed in position and further portions of the three cables are wound around newly appearing blocks, etc. It can thus be seen that one can readily assemble an endless stator coil system, limited only by the length of the available cable. However, the cable itself may be freshly made upstream of the coil assembly. A practical limit, however, may be the capacity of a storage drum onto which one winds the coil assembly. It should be noted that the end pieces 12 do not impede the winding or coiling of the assembly because they are spaced from each other and have a bevelled contour. They resemble, therefore, a chain made of concatenated pieces.

FIG. 3 is a perspective view of the coil assembly with end pieces in place, except two. The figure shows also a stator core and one can readily place the coil assembly into the grooves. This assembly may take place right after the manufacture of the coil assembly or elsewhere, the coil assembly may be brought to that place on a storage drum.

After the coil assembly has been combined with the stator core, it is desirable or even necessary to make sure that the coils are retained in the grooves. For this, one may place simple rod-like elements 15 into the grooves 2 on top of the respective cable length that has been inserted in each instance. Conceivably, one may even combine the coil assembly with these lock elements 15 upon making the assembly, and elements 15 are then simply snapped into the grooves or otherwise connected to the core.

Another modification or supplement is to be seen in the following. Individual short sleeves, having the length of the grooves and gaps, are threaded or otherwise placed onto the cables prior to assembly in the dummy, for purposes of completely filling the wider gap. These sleeves may be provided with the locking elements; they may have been molded onto the sleeves as a part thereof.

It can readily be seen that the inventive method is used to prefabricate a coherent and unitary coil structure made of cable and placed in simple patterns in an assembly acessory, the dummy 9. The interconnection of the cable is likewise a simple task merely involving placing end pieces 12 into lateral alignment with every other block 10 on the dummy belt and on one side, and in lateral alignment with the in-between blocks 10 on the other side. The cable when wound holds the cable together, and inserted pieces 13 prevent the cable from escaping. All these operations do not require any great skill. The ladder-like coil assembly can be wound on the storage drum as portions are taken off the dummy.

Placement of the assembly into the grooves of the stator core is likewise an easy task. Particularly, no electrical type circuit assemblies have to be made or supervised, as long as the cables are consistently laid in the dummy in uniform meander patterns. As stated, the stator may be installed along a vehicle track, requiring more than one full drum capacity of coil assemblies. However, the number of electrical connections to be made is quite small even over a long track.

The invention is not limited to the embodiments described above but all changes and modification thereof not constituting departures from the spirit and scope of the invention are intended to be included.

We claim:

1. Method of making a stator for a linear motor, comprising the steps of:

providing a dummy which includes spacer blocks separated by parallel grooves, resembling in length and width respectively the length and width of grooves in a stator core;

using the dummy to establish windings by placing three different cables into the grooves, each in a meandering pattern, whereby each of the cables is placed into grooves separated from each other by respective two grooves, and each of the three cables being placed into different grooves, thereby forming loops as coil ends which overlap each other adjacent to the blocks;

tying the loops of the cables together;

removing the cables as placed and as tied into a uniform and coherent configuration, from the dummy and as being held together as the result of the tying step; and placing the cables as removed into parallelly extending grooves of a stator core.

2. Method as in claim 1, using a dummy in which a plurality of spacer blocks are mounted on an endless belt or chain.

3. Method as in claim 1, wherein the loops of the cable are tied together by means of end elements.

4. Method of making a stator for a linear motor, comprising the steps of:

providing a series of parallel grooves being spaced corresponding to the spacing of grooves in a stator core, but not constituting the stator core grooves;

placing three different cables into the grooves as provided so that each groove as provided receives a section of one of the cables, and running each cable in a meandering pattern so that three sequential grooves each receive different ones of the three cables, thereby resulting in overlapping cable loops, each loop running from an end of one of the grooves as provided to an end of another one of the grooves as provided;

tying the overlapping ones of the cable loops together to establish a uniform and coherent configuration in order to permit subsequent placement of the parallel sections of the cable into the stator core grooves; and placing the parallel sections of the cable into the stator core grooves as held together due to the tying step.

* * * * *